April 12, 1955  A. RAPPL  2,706,291
WINDSHIELD WIPER BLADE
Filed Jan. 8, 1949
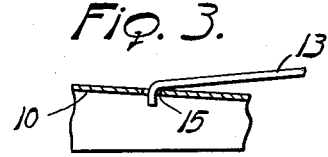
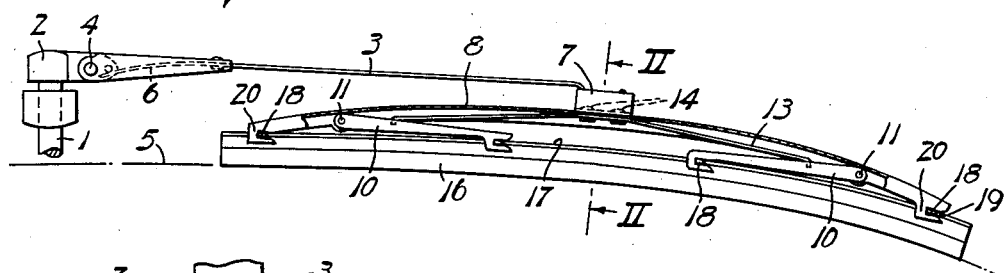
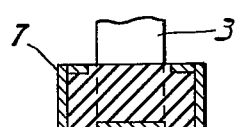
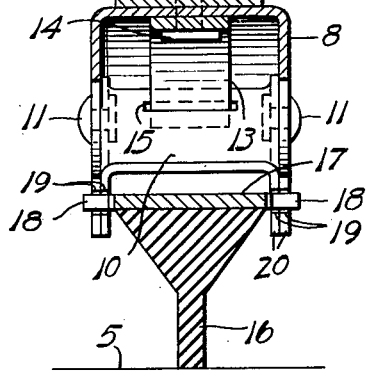
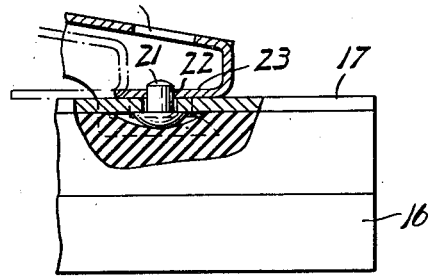
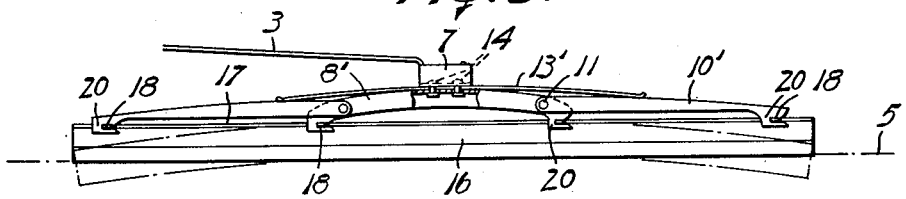
INVENTOR
Anton Rappl
BY
Bean, Brooks, Buckley & Bean.
ATTORNEYS – # United States Patent Office 2,706,291
Patented Apr. 12, 1955

2,706,291

WINDSHIELD WIPER BLADE

Anton Rappl, Eggertsville, N. Y., assignor to Trico Products Corporation, Buffalo, N. Y.

Application January 8, 1949, Serial No. 69,928

9 Claims. (Cl. 15—255)

This invention relates to the windshield cleaning art and more especially to a wiping blade which is a applicable to flat surfaces but primarily designed for use on curved windshields and windows.

Wiper blades for curved surfaces have in the past assumed various designs in an effort to accommodate the changes in surface contour throughout the path of wiper travel.

The primary object of this invention is to provide a wiper which is simple and compact in construction and one which will afford substantial support for the flexible wiping edge.

Further, the invention resides in a wiping blade which will effectively distribute the arm pressure to the wiping edge for greater wiping efficiency.

The foregoing and other objects will manifest themselves as this description progresses, reference being made to the accompanying drawing, wherein:

Fig. 1 is a view showing a practical application of the invention with the improved wiper partly in section;

Fig. 2 is a transverse section thereof about on line 2—2 of Fig. 1;

Figs. 3 and 4 are detail sectional views of the wiper; and

Fig. 5 is a modification.

Referring more particularly to the accompanying drawing, the numeral 1 designates an oscillatory power shaft to which the wiper actuating arm is attached, such arm having an inner shaft-affixed section 2 and an outer wiper carrying section 3 which is pivotally connected thereto by a pin 4 and pressed toward the windshield surface 5 by a spring leaf 6 in a well known manner. The wiper is attached to the outer end of the arm by a clip 7.

The wiper comprises a holder unit and a squeegee unit. The holder unit comprises a primary pressure distributing yoke 8, having means for connecting its opposite ends directly to the squeegee, and secondary pressure distributing members 10 of a resilient nature interposed between the primary yoke and the squeegee unit for applying a yielding pressure thereto at points spaced longitudinally from the yoke connections therewith. The members 10, as illustrated, are rigid levers or links, each having one end pivotally connected by a pin 11 to the yoke, and having means at the opposite end for connecting the link to the squeegee. A flat spring 13 presses upon each link to place a resilient urge upon the underlying squeegee part. The spring may be anchored at 14 to the primary yoke and have its outer end downturned into an aperture 15 in the adjacent lever with a loose or free fit. The two springs for both levers may comprise but a single flat spring, as shown in Fig. 1.

By this arrangement the arm pressure is transmitted and applied directly to the opposite ends of the squeegee while the intermediate portion of the wiping edge has the arm pressure applied indirectly as well as resiliently thereto.

In the modified showing of Fig. 5, a relatively shorter primary pressure distributing yoke 8' is employed for transmitting the arm pressure directly to the intermediate portion of the squeegee while the secondary pressure distributing members 10' apply the arm pressure indirectly and resiliently to the opposite ends of the squeegee, the flat springs 13' cooperating with the levers or links 10' in like manner as in the first described embodiment.

The squeegee unit has a rubber wiping body 16 with a backing strip 17 of light spring metal. From the opposite margins of this backing strip extend lugs 18 which are slidably engaged in the slots or seats 19 formed in the squeegee-straddling ears 20 on the opposite ends of the yoke and on the free ends of the levers 10 and 10'. The lugs may be engaged and disengaged by moving the squeegee unit longitudinally relative to the holder unit, a latch pin 21 engaging in a recess 22 to secure the engagement when effected. The latch pin may be carried by the squeegee and backed by the rubber body to yieldably project the pin through the backing strip. The recess 22 may be formed in a flange 23 turned under one end of the pressure distributing yoke 8. The lugs 18 and the ears 20 constitute loose pivotal or flexible connections enabling the squeegee unit to flex about the four longitudinally spaced points of support on or attachment to the holder unit. The holder unit therefore provides a flexible support for the squeegee unit in which the primary pressure distributing members are relatively fixed and the secondary presssure distributing members are relatively movable under a spring urge. This differential urge enables a firm wiping contact with adjacent points modified thereover. The squeegee unit is readily detached by inserting a tool through an overlying opening 24 in the yoke and depressing the pin out of engagement with the recess 22.

By reason of the foregoing structure the wiping edge of the squeegee unit is given a firm wiping contact with the windshield surface at spaced points, and at other points the spring backed links will give a more sensitive wiping pressure as determined by the backing springs 13, 13'. Since each backing spring is anchored at one end to the yoke and bears down at its opposite end upon a lever, the backing spring will react to lift upon the rigid yoke and thereby modify the arm-applied pressure as transmitted by the opposite ends of the rigid yoke to the backing strip.

The foregoing description has been given in detail for clarity and not by way of limitation since the inventive principles involved are capable of assuming other physical embodiments without departing from the spirit of the invention and the scope of the appended claims.

What is claimed is:

1. A wiper for curved surfaces, having an elongate squeegee unit including a flexible wiping element and a substantially laterally rigid backing strip of greater width than thickness flexible in the direction of a plane normal to the surface being wiped and provided with opposite side margins, and a holder unit therefor having means of attachment to an actuating arm, said holder unit comprising a rigid pressure distributing member directly transmitting pressure to the central area of the squeegee unit, and secondary pressure distributing members in the form of levers pivotally supported by the first member and operatively engaging the said opposite side margins at its opposite end portions to hold the backing strip in position for conformity to a surface to be wiped, and spring means supported by the first member and having terminal parts resiliently bearing upon the levers to impose a yieldable urge upon the squeegee unit at points longitudinally spaced from the central area.

2. A wiper for curved surfaces, having an elongate squeegee unit flexible in a plane normal to the surface being wiped, and a holder unit therefor having means of attachment to an actuating arm, said holder unit comprising a rigid pressure distributing yoke attached at its opposite ends to the squeegee unit at longitudinally spaced points, and secondary pressure distributing members in the form of levers pivotally supported by the yoke and engaging the squeegee unit at other longitudinally spaced points, spring means fixed to the yoke and having terminal parts resiliently bearing upon the levers to impose a yieldable urge upon the squeegee unit at points longitudinally spaced from the yoke connections therewith, said yoke and levers having means detachably connecting the squeegee unit thereto by and upon relative movement between the two units lengthwise thereof, with means for securing the two units against relative movement.

3. A wiper comprising a squeegee unit provided with a nonextensible backing strip flexible in a plane normal to the surface being wiped, a rigid pressure distributing yoke having its opposite ends flexibly connected to the backing strip at longitudinally spaced points for positively applying pressure thereto and having intermediately arranged arm attaching means, pressure distributing rigid levers each pivoted at one end on the yoke and having its opposite end bearing upon and flexibly connected to the backing strip at a point spaced from the first points, said yoke being channeled in cross section, and said levers having their first ends within the yoke channel, and spring means arranged within the yoke channel and resiliently acting upon the levers at points spaced longitudinally from their pivotal connections with the yoke.

4. A wiper comprising a squeegee unit provided with a nonextensible backing strip flexible in a plane normal to the surface being wiped, a rigid pressure distributing yoke having its opposite ends flexibly connected to the backing strip at longitudinally spaced points for positively applying pressure thereto and having intermediately arranged arm attaching means, pressure distributing rigid links each pivoted at one end on the yoke and having its opposite end overhanging a respective end of the yoke and flexibly connected to the backing strip at a point outwardly beyond the yoke, and spring means anchored on the yoke and bearing upon the links.

5. A wiper for curved surfaces, having an elongate squeegee unit having a spring backing strip flexible in a plane normal to the surface being wiped, and a holder unit therefor having a rigid pressure distributing yoke having its opposite ends slidably connected to the opposite side margins of the backing strip at longitudinally spaced points, means for attaching the yoke to an actuating arm, and a secondary resilient pressure distributing link means mounted on the yoke between its ends and providing an independent cushioned support for the medial portion of the squeegee unit at a point spaced longitudinally inward from the other points.

6. A windshield wiper comprising a flexible blade having a nonextensible resilient backing strip; and a pressure distributing superstructure therefor including a rigid yoke adapted for connection to a spring pressed actuating arm and having its opposite ends connected to the backing strip at longitudinally spaced points for directly applying the arm pressure thereto, a pair of levers pivoted at spaced points on the rigid yoke and extending in opposite directions toward and bearing upon the backing strip, and a spring leaf for each lever pressing at one end through the lever upon the backing strip and reacting at its opposite end upon the rigid yoke to modify the spring arm pressure applied therethrough to said spaced points.

7. A windshield wiper comprising a flexible blade having a nonextensible resilient backing strip; and a pressure distributing superstructure therefor including a rigid yoke having its opposite ends connected to the backing strip at longitudinally spaced points and its medial portion adapted for connection to a spring pressed actuating arm, for directly applying the arm pressure to the backing strip, and a spring pressed lever pivotally mounted on one end of the rigid yoke and having one end connected to the backing strip for resiliently applying its spring pressure thereto, the spring pressure as applied to the lever reacting upon the rigid yoke to modify the spring arm pressure applied through the rigid yoke to said spaced points.

8. A wiper comprising a squeegee unit provided with a nonextensible backing means flexible in a plane normal to the surface to be wiped, a rigid pressure distributing yoke having its opposite end portions directly connected to the backing means at longitudinally spaced points for positively applying pressure to said backing means, an actuating arm connected to said yoke, said arm including spring means for applying positive pressure to said yoke, and resilient pressure means including a spring urged link member connected at one end portion to the yoke and having its other end portion operably connected to the squeegee unit at a point spaced from the direct connection of said yoke with said backing means for modifying the positively applied pressure of said yoke, said end portion of said link which is operably connected to said unit being movable relative to said yoke in a plane normal to the surface to be wiped.

9. A wiper comprising a squeegee unit provided with a nonextensible backing means flexible in a plane normal to the surface to be wiped, a rigid pressure distributing yoke having its opposite end portions directly connected to the backing means at longitudinally spaced points for positively applying pressure to said backing means, an actuating arm connected to said yoke, said arm including spring means for applying positive pressure to said yoke, and resilient pressure means carried by said yoke and having an end portion operably connected to the squeegee unit at a point beyond said yoke for modifying the positively applied pressure of said yoke.

References Cited in the file of this patent

UNITED STATES PATENTS

| | | |
|---|---|---|
| 1,169,280 | Ousley | Jan. 25, 1916 |
| 1,183,463 | Jepson | May 16, 1916 |
| 1,286,594 | Iriye | Dec. 3, 1918 |
| 1,953,703 | Dirienzo | Apr. 3, 1934 |
| 2,254,343 | Zierer | Sept. 2, 1941 |
| 2,537,411 | Klingler | Jan. 9, 1951 |
| 2,596,063 | Anderson | May 6, 1952 |
| 2,672,641 | Scinta et al. | Mar. 23, 1954 |

FOREIGN PATENTS

| | | |
|---|---|---|
| 433,467 | Great Britain | Aug. 15, 1935 |
| 820,156 | France | July 26, 1937 |